United States Patent
LaRoche et al.

(10) Patent No.: US 9,939,032 B1
(45) Date of Patent: Apr. 10, 2018

(54) METHOD OF CONTROLLING A TRANSMISSION CLUTCH

(71) Applicant: Ford Global Technologies, LLC, Dearborn, MI (US)

(72) Inventors: Cory Benson LaRoche, Wixom, MI (US); Bradley Dean Riedle, Northville, MI (US); Stephen Michael Cicala, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/416,526

(22) Filed: Jan. 26, 2017

(51) Int. Cl.
*F16D 48/06* (2006.01)

(52) U.S. Cl.
CPC .... *F16D 48/066* (2013.01); *F16D 2500/1045* (2013.01); *F16D 2500/10412* (2013.01); *F16D 2500/30406* (2013.01); *F16D 2500/30407* (2013.01); *F16D 2500/30421* (2013.01); *F16D 2500/30814* (2013.01); *F16D 2500/5016* (2013.01)

(58) Field of Classification Search
None
See application file for complete search history.

(56) References Cited

U.S. PATENT DOCUMENTS

| | | | | |
|---|---|---|---|---|
| 4,638,898 A * | 1/1987 | Braun | ................... | B60W 10/02 477/86 |
| 4,706,790 A * | 11/1987 | Lockhart | ............... | F16H 61/143 192/3.3 |
| 4,905,801 A * | 3/1990 | Tezuka | ................... | B60W 10/02 192/21.5 |
| 5,403,249 A * | 4/1995 | Slicker | .................... | F16D 48/06 192/103 R |
| 5,991,680 A | 11/1999 | Kona et al. | | |
| 6,050,379 A * | 4/2000 | Lyon | ....................... | F16D 28/00 192/54.1 |
| 8,092,339 B2 * | 1/2012 | Heap | ..................... | B60K 6/445 477/5 |
| 8,214,116 B2 | 7/2012 | Whitton | | |
| 8,489,298 B2 * | 7/2013 | Otanez | .................. | F16H 61/143 477/166 |
| 8,504,267 B2 * | 8/2013 | Weingartz | ............. | F16D 48/066 701/68 |
| 8,630,777 B2 * | 1/2014 | Phillips | ................. | B60W 10/02 477/62 |
| 9,260,102 B2 | 2/2016 | Teslak et al. | | |
| 2012/0203406 A1 * | 8/2012 | Akebono | .............. | B60W 10/02 701/22 |

* cited by examiner

*Primary Examiner* — Dirk Wright
(74) *Attorney, Agent, or Firm* — James Dottavio; Brooks Kushman P.C.

(57) ABSTRACT

During the inertia phase of a shift, the oncoming clutch is controlled to alleviate shift quality degradation due variability of clutch friction coefficient. The friction coefficient sometimes increases as the slip speed nears zero. The commanded clutch pressure is a sum of an open loop term and a closed loop term. The open loop term decreases as the clutch slip decreases. Thus, when the friction coefficient increases at the end of the inertia phase, the clutch torque remains nearly constant. When the friction coefficient does not increase at the end of the inertia phase, the closed loop term responds to the resulting decreasing rate of slip speed reduction.

14 Claims, 7 Drawing Sheets

007# METHOD OF CONTROLLING A TRANSMISSION CLUTCH

TECHNICAL FIELD

This disclosure relates to the control of automatic transmission clutches. More particularly, the disclosure pertains to a method of controlling an oncoming clutch during an inertia phase of a shift to improve shift quality at the end of the shift.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Many automatic transmissions implement a discrete number of different transmission ratios in which each ratio is establish by engaging a particular subset of clutches. A clutch that selectively holds a gearing element against rotation may be called a brake. Some clutches may be actively controlled such as by hydraulic actuation. Other clutches may be passive devices such as one way clutches. To shift from one speed ratio to another speed ratio, one clutch is engaged and another clutch is released. The process of shifting from one speed ratio to another may create torque disturbances at the transmission output. If these torque disturbances are excessive, vehicle occupants may find them unpleasant.

SUMMARY OF THE DISCLOSURE

A method of controlling a transmission includes calculating open loop and closed loop pressure commands and commanding a clutch apply pressure equal to the sum of the open and closed loop pressure commands. The calculating and commanding may occur during an upshift inertia phase for which the clutch is an oncoming element. The open loop pressure command in calculated based on a clutch slip speed such that the open loop pressure command decreases as the slip speed decreases. The open loop pressure command may also be based on a transmission input torque. The closed loop pressure command is calculated based on a rate of change of the clutch slip speed. The slip speed may be calculated, for example, using data from output and turbine shaft speed sensors.

A method of controlling a transmission clutch includes supplying fluid at a controlled pressure to a clutch apply chamber and adjusting the controlled pressure in response to a clutch slip speed. The controlled pressure may be a sum of an open loop term and a closed loop term. In response to a clutch speed decreasing at a constant rate, the controlled pressure is reduced. This may occur, for example, because the open loop term decreases as the clutch slip decreases. In response to the rate of decrease of the clutch speed decreasing, the controlled pressure is increased. This may occur, for example, as a result of the closed loop term increasing.

A transmission includes a clutch, a valve body, and a controller. The valve body supplies fluid at a controlled pressure to an apply chamber of the clutch. The controller reduces the controlled pressure in response to a clutch slip speed decreasing at a constant rate. The controller increases the controlled pressure in response to a rate of decrease of the clutch speed decreasing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
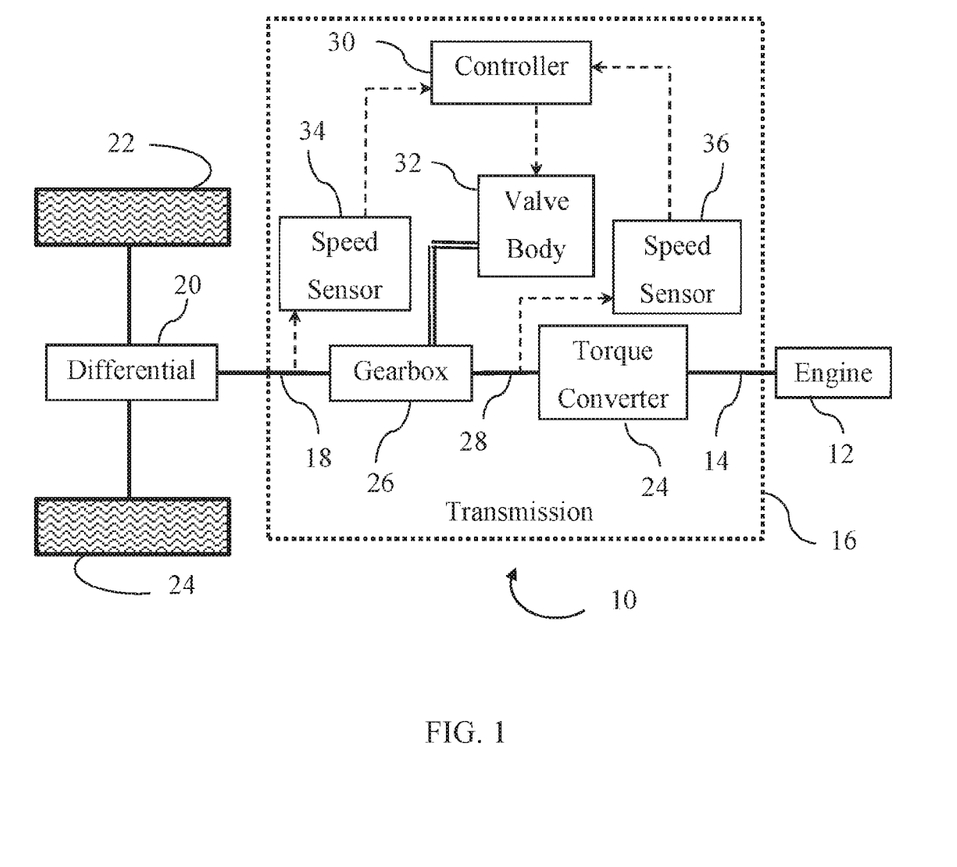
FIG. 1 is a schematic of a vehicle powertrain suitable for use with the disclosed method.

A powertrain of a vehicle 10 is illustrated schematically in FIG. 1. Solid lines indicate mechanical connections. Broken lines represent the flow of signals. Double lines represent the flow of fluid. Engine 12 provides power to rotate crankshaft 14. Transmission 16 transmits the power from crankshaft 14 to driveshaft 18 while potentially modifying the speed and torque to be more suitable to the present vehicle requirements. Differential 20 distributes the power to a left wheel 22 and a right wheel 24 while permitting slight speed differences between the wheels such as when the vehicle turns a corner.

The transmission 16 includes a torque converter 24 and a gearbox 26. The torque converter transmits the power from crankshaft 14 to turbine shaft 28. Gearbox 26 transmits the power from turbine shaft 28 to driveshaft 18. Controller 30 sends signals to valve body 32 causing valve body 32 to send pressurized fluid to clutches in gearbox 26. The gear ratio of gearbox 26 depends upon which subset of the clutches are provided with pressurized fluid. Controller 30 utilizes many inputs to determine what commands to send to valve body 32 including signals from output speed sensor 34 and turbine speed sensor 36.

Figure 2:
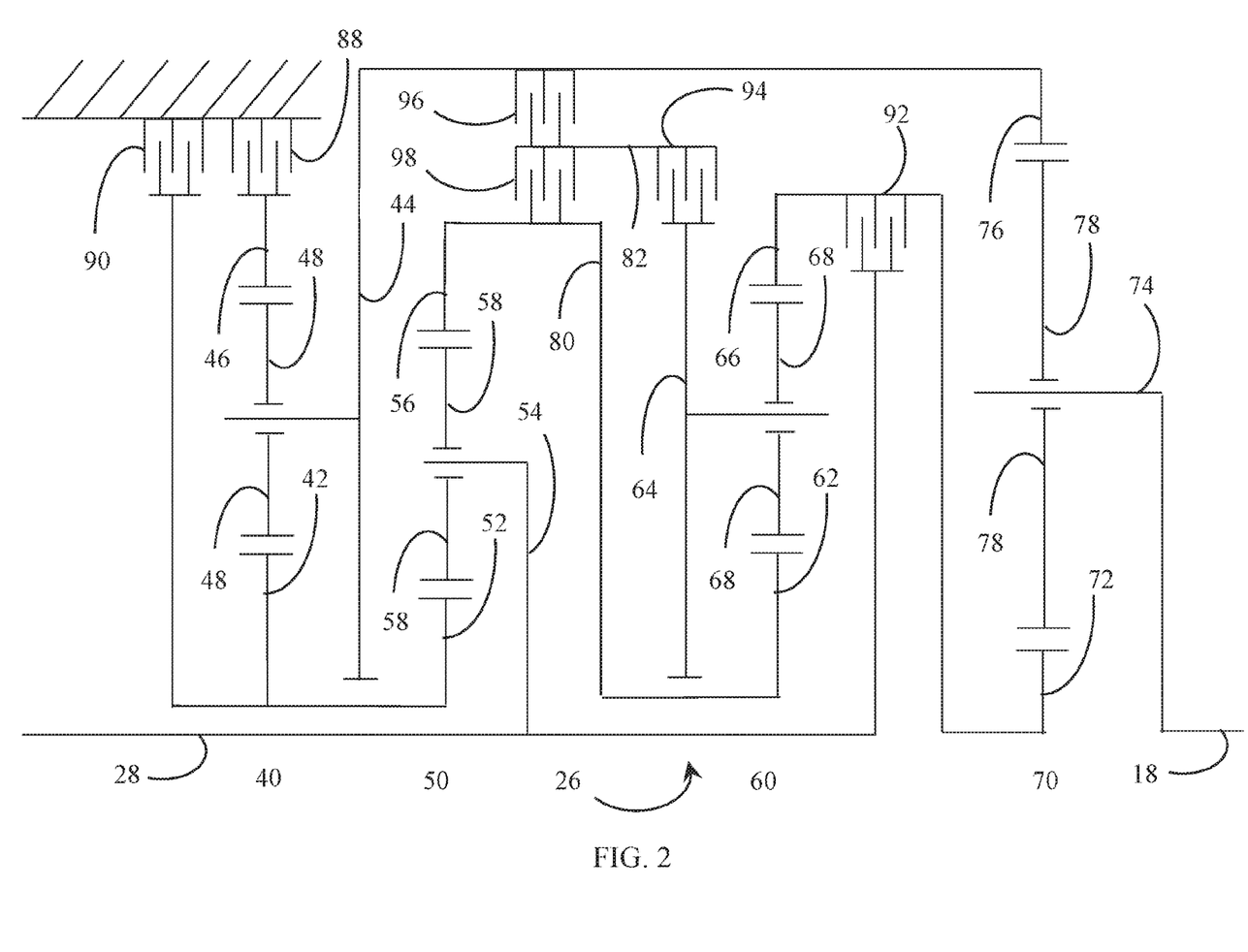
FIG. 2 is a schematic diagram of an exemplary transmission gearing arrangement suitable for use with the disclosed method.

An example gearbox is schematically illustrated in FIG. 2. The proposed method is applicable to a wide variety of gearbox arrangements. The gearbox utilizes four simple planetary gear sets 40, 50, 60, and 70. Sun gear 42 is fixed to sun gear 52, carrier 44 is fixed to ring gear 76, ring gear 56 is fixed to sun gear 62 by shaft 80, ring gear 66 is fixed to sun gear 72, turbine shaft 28 is fixed to carrier 54, and driveshaft 18 is fixed to carrier 74. Ring gear 46 is selectively held against rotation by brake 88 and sun gears 42 and 52 are selectively held against rotation by brake 90. Turbine shaft 28 is selectively coupled to ring gear 66 and sun gear 72 by clutch 92. Intermediate element 82 is selectively coupled to carrier 64 by clutch 94, selectively coupled to carrier 44 and ring gear 76 by clutch 96, and selectively coupled to shaft 80 by clutch 98.

As shown in Table 1, engaging the clutches and brakes in combinations of four establishes ten forward speed ratios and one reverse speed ratio between turbine shaft 28 and driveshaft 18. An X indicates that the corresponding clutch is engaged to establish the speed ratio.

TABLE 1

| | 88 | 90 | 92 | 94 | 96 | 98 | Ratio | Step |
|---|---|---|---|---|---|---|---|---|
| Rev | X | X | | X | X | | −4.79 | 102% |
| 1st | X | X | X | X | | | 4.70 | |
| 2nd | X | X | | X | | X | 2.99 | 1.57 |
| 3rd | X | | X | X | | X | 2.18 | 1.37 |
| 4th | X | | | X | X | X | 1.80 | 1.21 |
| 5th | X | | X | | X | X | 1.54 | 1.17 |
| 6th | X | | X | X | X | | 1.29 | 1.19 |
| 7th | | | X | X | X | X | 1.00 | 1.29 |
| 8th | | X | X | X | X | | 0.85 | 1.17 |
| 9th | | X | X | | X | X | 0.69 | 1.24 |
| 10th | | X | | X | X | X | 0.64 | 1.08 |

All single step and two step shifts are performed by gradually engaging one clutch, called an oncoming element, while gradually releasing a different clutch, called the off-going element. During each of these shifts, three clutches, called holding elements, are maintained fully engaged while one element is maintained fully disengaged. In other gearbox arrangements, the number of holding elements may be different.

Figure 3:
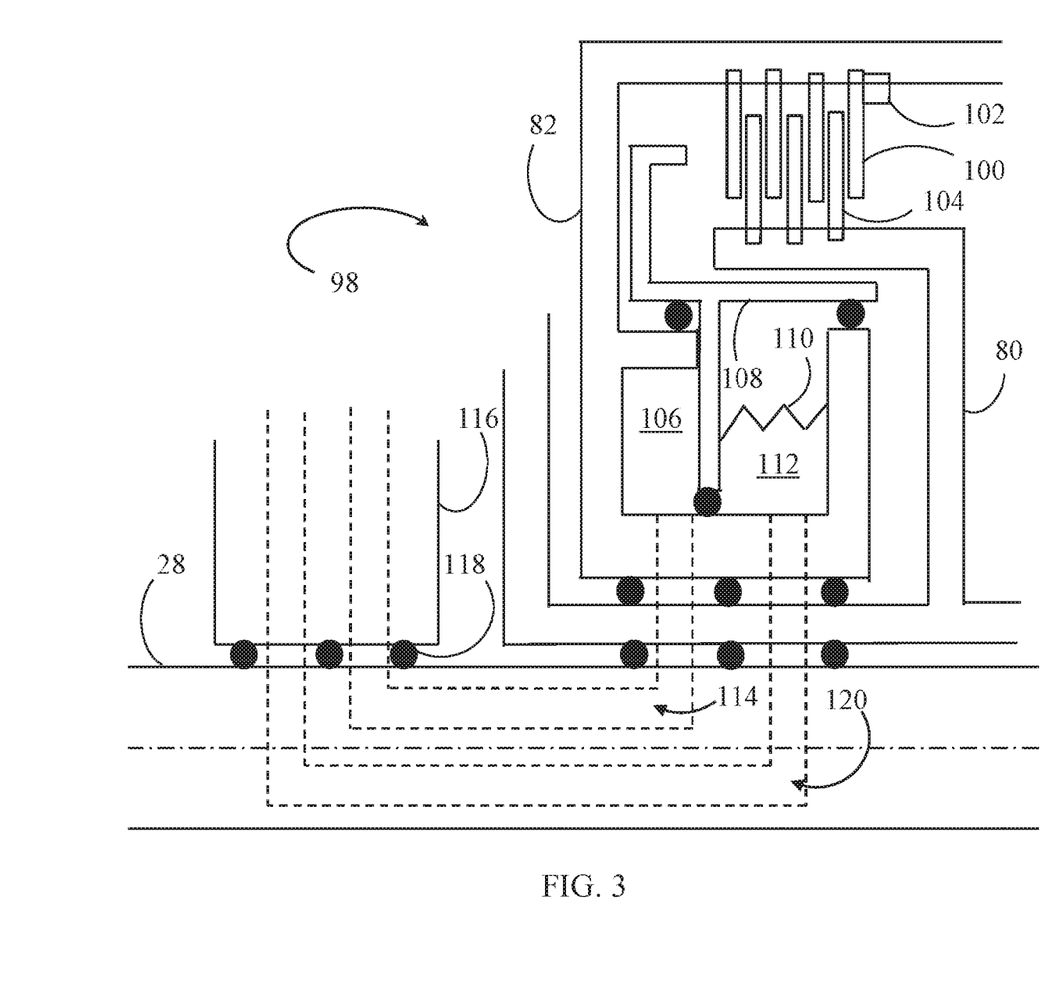
FIG. 3 is a cross sectional view of a transmission clutch in a fully open position.

FIG. 3 shows a cross section of clutch 98. Clutch housing 82, the intermediate element in FIG. 2, is supported to rotate around shaft 80, which is, in turn, supported to rotate around turbine shaft 28. A set of separator plates 100 are splined to housing 82 such that they rotate with housing 82 but are free to slide axially. Snap ring 102 restrains the axial movement toward the right. A set of friction plates 104 are splined to shaft 80 and are interleaved with the separator plates 100. The friction plates and separator plates may collectively be referred to as a clutch pack. When pressurized hydraulic fluid is routed to apply chamber 106, piston 108 slides axially with respect to housing 82. After piston 108 moves into contact with the clutch plate, the force squeezes the friction plates and separator plates together. Friction between the friction plates and separator plates transmits torque between housing 82 and shaft 80. The maximum amount of torque that can be transmitted at a given moment is called the torque capacity of the clutch. When the pressure in apply chamber 106 is relieved, return spring 110 pushes piston 108 away from the clutch pack to release the clutch. When clutch housing 82 rotates, centrifugal force tends to increase the pressure of fluid in apply chamber 106 which tends to engage the clutch. To avoid unintentional engagement, unpressurized fluid is routed to balance chamber 112. Centrifugal force pressurizes the fluid in the balance chamber, counteracting the force generated by centrifugal force in the apply chamber.

Controller 30 regulates the current (or pulse width) to a solenoid in valve body 32 such that the pressure in a particular channel within valve body is regulated to a commanded pressure. The fluid then flows from the valve body to apply chamber through passageway 114. Passageway 114 goes through stationary front support 116, through turbine shaft 28, through shaft 80, and into housing 82. Since these components rotate at different speeds, seals 118 are used to route fluid from one component to another component. Similarly, the unpressurized fluid is routed to balance chamber 112 through passageway 120.

The torque capacity of the clutch at any point in time is given by the formula:

$$T = 2*(A*(P_{apply} - P_{balance}) - F_0)*N*\mu*r$$

where A is the area of the piston at the apply and release chambers, $P_{apply}$ is the fluid pressure in apply chamber 106, $P_{balance}$ is the fluid pressure in balance chamber 112, $F_0$ is the return spring force, N is the number of friction plates, $\mu$ is the friction coefficient between the friction plates and the separator plates, and r is the mean radius of the friction plates. $P_{apply}$ and $P_{balance}$ are set by controller 30. A, N, and r are stable geometric properties. $F_0$ does not vary substantially. However, the friction coefficient $\mu$ is subject to variation based on a number of factors, some of which are impractical to predict. For example, the inventors have observed that $\mu$ may sometimes vary with respect to clutch slip speed (the difference between the rotational speeds of shaft 80 and housing 82). In particular, the inventors have observed that $\mu$ sometimes increases as the slip speed decreases. The fact that this does not occur in all cases makes compensation for this variation particularly challenging.

Figure 4:
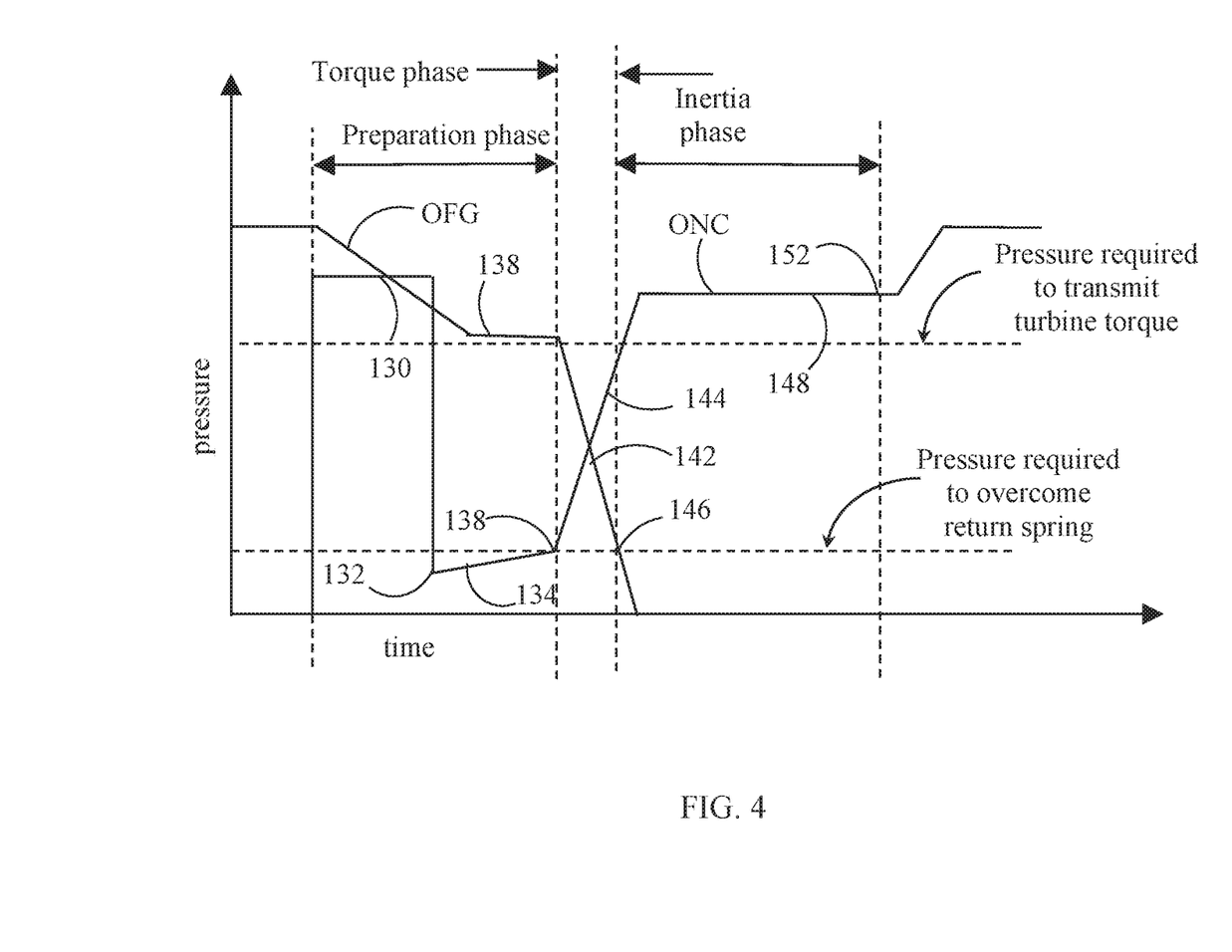
FIG. 4 is a graph of commanded clutch pressures during a synchronous upshift.
Figure 5:
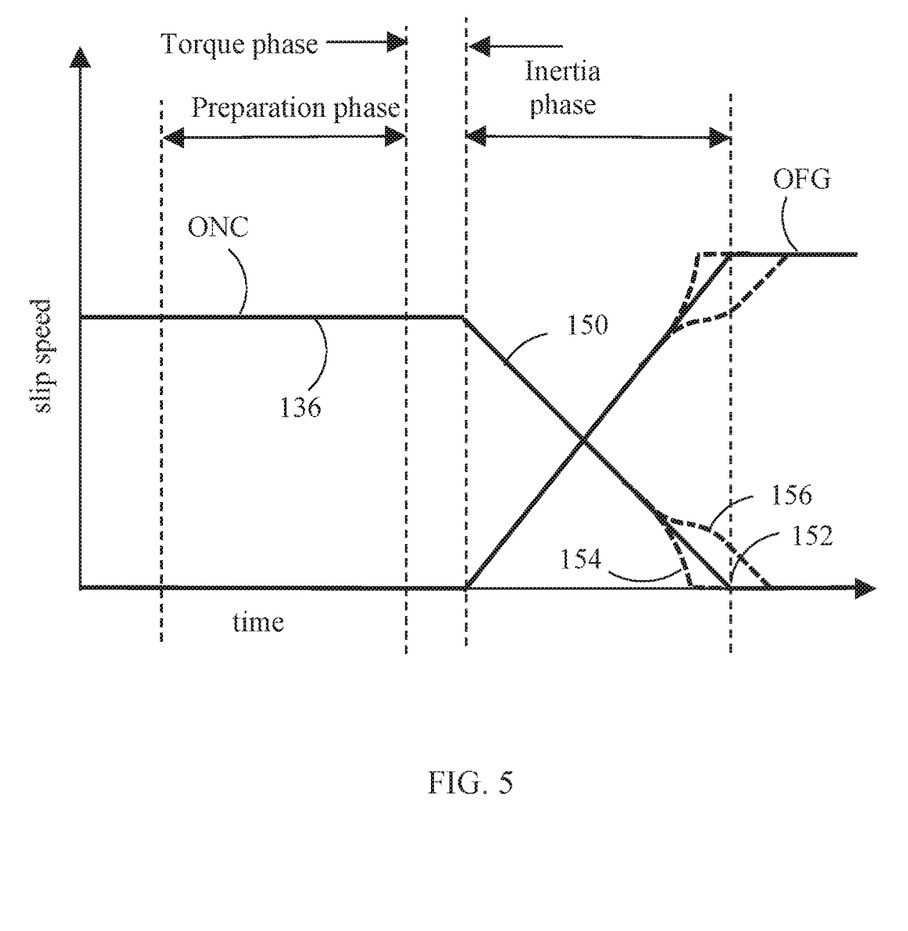
FIG. 5 is a graph of clutch slip speeds during a synchronous upshift.

FIG. 4 illustrates commanded pressure profiles for the oncoming clutch (ONC) and the off-going clutch (OFG) during a synchronous upshift. (An upshift is synchronous if the off-going clutch is actively controlled and non-synchronous if the off-going clutch is a passive one-way clutch.) FIG. 5 illustrates the slip speed across the two clutches.

After the shift scheduling algorithm, or a driver command, indicates that an upshift should be performed, the controller strokes the oncoming clutch during a preparatory phase. At 130, the pressure to the oncoming clutch is raised to a boost level for a boost duration. The purpose of the boost phase is to move the clutch piston as rapidly as possible from the disengaged position to the stroked position. The boost duration is generally selected such that the boost phase ends slightly before the piston is stroked. Then, at 132, a holding pressure is commanded. Then, at 134, the commanded pressure is gradually increased to gently move the piston into the fully stroked position. The slip across the oncoming clutch is based on the original gear ratio and does not change during the preparatory phase as shown at 136 in FIG. 5. The preparatory phase ends when the piston of the oncoming clutch is fully stroked at 138. During this time, the commanded pressure for the off-going clutch may be reduced, as shown at 140, such that the torque capacity is almost equal to the torque actually transmitted by the off-going clutch. Since the off-going clutch remains fully engaged during the preparatory phase, the slip across the off-going clutch is zero. Throughout this preparatory period, neither the torque ratio nor the speed ratio change.

Once the preparatory phase is complete, the torque transfer phase is executed by gradually reducing the commanded pressure of the off-going clutch as shown at 142 and gradually increasing the commanded pressure to the oncoming clutch as shown at 144. During this phase, the torque ratio gradually decreases to the upshifted value. Ideally, the speed ratio and the slip across each clutch remains constant, although it can increase if the off-going clutch is released too quickly compared to the rate at which the oncoming clutch is engaged. Once the torque capacity of the off-going clutch reaches zero at 146, the inertia phase begins.

During the inertia phase, the oncoming clutch acts to slow the input, gradually decreasing the transmission speed ratio to the upshifted value. The pressure of the oncoming clutch is set at 148 to create a torque capacity somewhat greater than required to transmit turbine torque. The excess capacity acts to reduce the speed of the turbine (and, indirectly, the engine crankshaft) at 150. The inertia phase ends at 152 when the oncoming clutch is no longer slipping. At that point, the speed ratio is equal to the speed ratio of the upshifted gear. Once the clutch is no longer slipping, the torque transmitted drops to the level required to transmit turbine torque. The pressure may be ramped up further to provide greater margin between the torque capacity and the transmitted torque to avoid allowing the clutch to slip again.

If the friction coefficient µ increases as the oncoming clutch slip speed decreases, then the torque capacity of the clutch will increase even though a constant apply pressure is being commanded throughout most of the inertia phase. This will cause the rate of change of slip speed to increase as shown by the dotted lines at 154. In this scenario, the output torque increases during the tail end of the inertia phase and then abruptly decreases as the inertia phase ends. The resulting sudden change in output torque can be uncomfortable to vehicle occupants and can set off audible vibrations in the driveline.

Use of feedback control is helpful in addressing unpredictable noise factors. For example, the controller may adjust the pressure to maintain a target rate of change of slip speed during the inertia phase. A feedback control algorithm may compute the commanded apply pressure as a sum of an open loop term and a closed loop term. The open loop term (sometimes called a feed-forward term) is a prediction of the pressure required to achieve the desired rate of change of slip speed, disregarding unpredictable noise factors. The closed loop term uses a measured signal to adjust for noise factors. An error signal is computed equal to a difference between the desired rate of change of slip speed and the measured rate of change of slip speed. The closed loop term may include sub-terms proportional to this error signal (a P sub-term), proportional to a derivative of the error signal (a D sub-term), and proportional to an integral of the error signal (an I sub-term). The inventors have discovered that, when increases late in the inertia phase, the closed loop term does not react sufficiently fast to avoid shift quality degradation.

Figure 6:
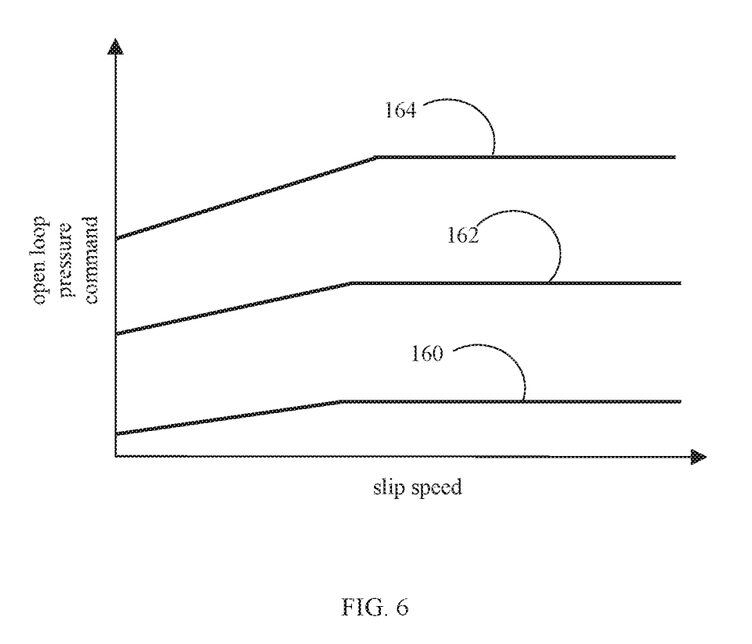
FIG. 6 is a graph showing an exemplary open loop pressure command calibration function.

The inventors have determined that it is preferable to decrease the open loop term as the slip speed decreases. FIG. 6 shows exemplary graphs of the open loop pressure term as a function of clutch slip speed. Curve 160 represents the open loop term at a low input torque, curve 162 represents the open loop term at a moderate input torque, and curve 164 represents the open loop term at a high input torque. The controller may interpolate between these curves for other values input torques. The data in FIG. 6 may be represented in the controller as a lookup table. During shift events in which increases, the rate of change of slip speed remains constant as shown by line 150 in FIG. 5. During shift events in which remains constant, the rate of change of slip speed decreases as shown at 156. This lengthens the inertia phase, allowing time for the closed loop term to compensate by increasing the pressure command.

Figure 7:
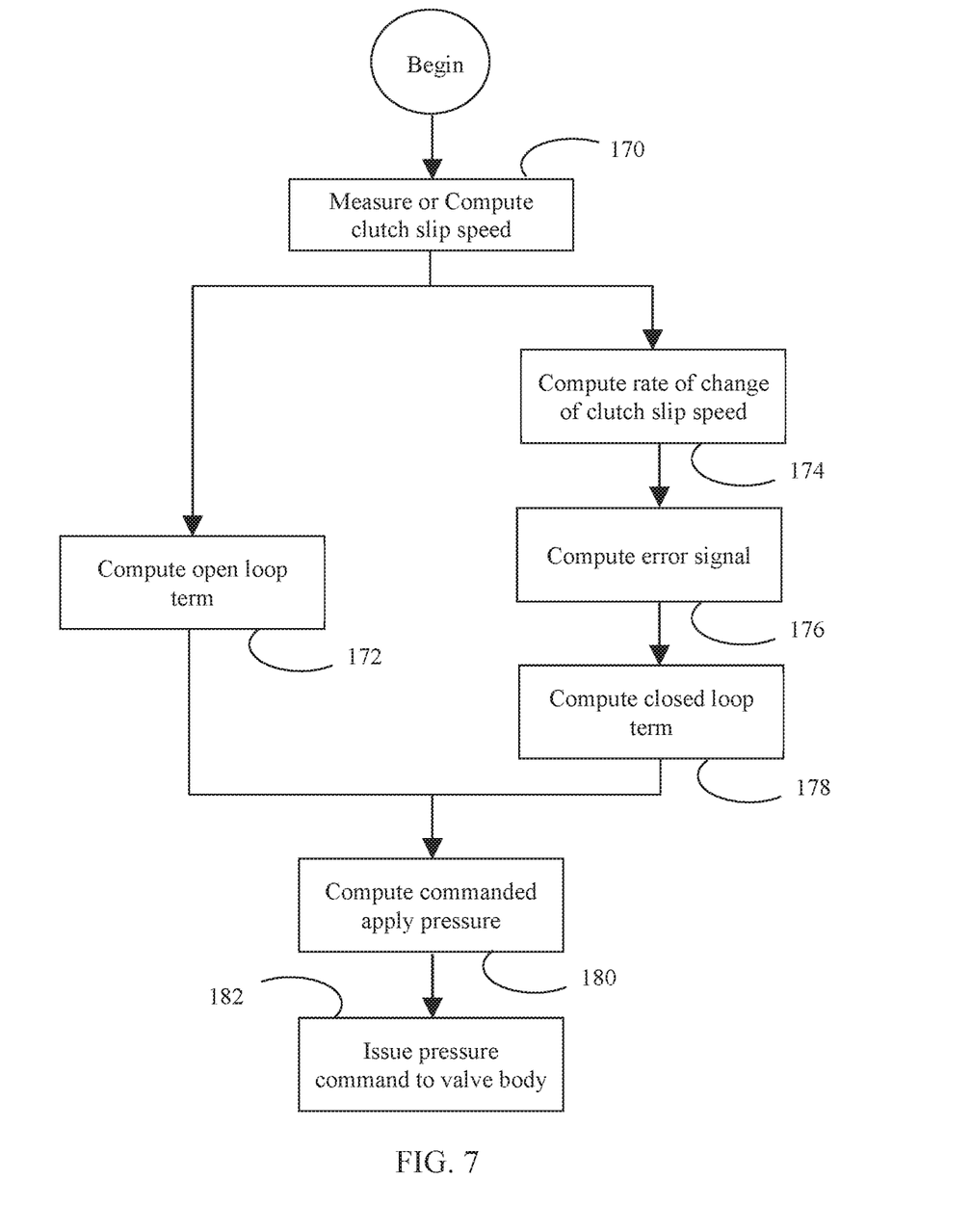
FIG. 7 is a flow chart illustrating the disclosed method.

FIG. 7 is a flow chart illustrating control of the oncoming clutch. This procedure is executed at regular intervals throughout the inertia phase. At 170, the controller computes the clutch slip. This can be accomplished by using two speed sensors, such as output and turbine speed sensors, and known speed relationships among transmission elements. At 172, the controller computes the open loop term based on transmission input torque, and the clutch slip. At 174, the controller computes a rate of change of slip speed. This may be performed by comparison to slip speeds computed at previous time intervals. Then, at 176, the controller computes an error term by subtracting the computed rate of change of slip speed from a target slip speed. At 178, the controller computes the closed loop pressure command term based on the error term and P, D, and I sub-terms as discussed above. At 180, the pressure command is computed by adding the open loop and closed loop terms computed at 172 and 178. Finally, at 182, a command is issued to the valve body to effectuate this pressure.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling a transmission clutch comprising:
    calculating an open loop pressure command based on a clutch slip speed such that the open loop pressure command decreases as the slip speed decreases;
    calculating a closed loop pressure command based on a rate of change of the clutch slip speed; and
    commanding a clutch apply pressure equal to a sum of the open loop pressure command and the closed loop pressure command.

2. The method of claim 1 wherein the open loop pressure command is further based on a transmission input torque.

3. The method of claim 1 wherein the transmission clutch is an oncoming clutch for a transmission upshift and the calculating and commanding occur during an inertia phase of the transmission upshift.

4. The method of claim 1 further comprising calculating the clutch slip speed based on input from an output shaft speed sensor and a turbine shaft speed sensor.

5. A method of controlling a transmission clutch comprising:
- supplying fluid at a controlled pressure to a clutch apply chamber;
- in response to a clutch slip speed decreasing at a constant rate, reducing the controlled pressure; and
- in response to a rate of decrease of the clutch slip speed decreasing, increasing the controlled pressure.

6. The method of claim 5 further comprising calculating the controlled pressure as a sum of an open loop term and a closed loop term.

7. The method of claim 6 wherein the open loop term decreases as the clutch slip speed decreases causing the reduction of the controlled pressure in response to the clutch slip speed decreasing at a constant rate.

8. The method of claim 7 wherein the open loop term is further based on a transmission input torque.

9. The method of claim 6 wherein the closed loop term is based on a difference between the rate of decrease of the clutch slip speed and a target rate of decrease of the clutch slip speed causing the increase of the controlled pressure in response the decreasing rate of clutch slip speed decrease.

10. The method of claim 5 wherein the transmission clutch is an oncoming clutch for a transmission upshift and the decreasing and increasing occur during an inertia phase of the transmission upshift.

11. A transmission comprising:
- a clutch;
- a valve body configured to supply fluid at a controlled pressure to an apply chamber of the clutch; and
- a controller configured to
  - in response to a clutch slip speed decreasing at a constant rate,
- reducing the controlled pressure, and
  - in response to a rate of decrease of the clutch slip speed decreasing, increasing the controlled pressure.

12. The transmission of claim 11 further comprising two speed sensors and wherein the controller is further configured to calculate the clutch slip speed based on data from the two speed sensors.

13. The transmission of claim 12 wherein the two speed sensors comprise a turbine speed sensor and an output shaft speed sensor.

14. The method of claim 11 wherein the clutch is an oncoming clutch for an upshift and the decreasing and increasing occur during an inertia phase of the upshift.

* * * * *